(12) United States Patent
Bourdelais et al.

(10) Patent No.: US 8,047,669 B2
(45) Date of Patent: Nov. 1, 2011

(54) BACKLIGHT ILLUMINATION ASSEMBLY HAVING A JOINING CLIP WITH DIFFUSION MEANS

(75) Inventors: Robert P. Bourdelais, Pittsford, NY (US); John C. Brewer, Rochester, NY (US); Qi Hong, Rochester, NY (US); Charles M. Rankin, Jr., Penfield, NY (US); Leonard S. Gates, Holley, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 306 days.

(21) Appl. No.: 12/462,287

(22) Filed: Jul. 31, 2009

(65) Prior Publication Data

US 2011/0026274 A1 Feb. 3, 2011

(51) Int. Cl.
*G09F 13/04* (2006.01)
(52) U.S. Cl. ... 362/97.3; 362/612; 362/634; 362/249.02
(58) Field of Classification Search .......... 362/612–613, 362/97.3, 249.02, 634; 346/62–65, 69
See application file for complete search history.

(56) References Cited

U.S. PATENT DOCUMENTS

| | | | |
|---|---|---|---|
| 5,999,685 A | 12/1999 | Goto et al. | |
| 6,416,201 B1 * | 7/2002 | Strand et al. | 362/224 |
| 6,746,129 B2 * | 6/2004 | Ohkawa | 362/625 |
| 7,125,152 B2 * | 10/2006 | Lin et al. | 362/609 |
| 7,324,174 B2 * | 1/2008 | Hafuka et al. | 349/61 |
| 7,604,365 B2 * | 10/2009 | Chang | 362/97.1 |

* cited by examiner

*Primary Examiner* — Robert May
(74) *Attorney, Agent, or Firm* — Edwin Oh

(57) ABSTRACT

A uniform light source having a substrate for providing structural and functional support to the assembly. A bottom reflector provided on the substrate. A plurality of solid state light sources provided in an opening of the bottom reflector for providing a point light source. A plurality of light films and having light redirecting areas provided between the plurality of solid state light sources for redirecting and spreading the point light source to a uniform plane of light; a joining clip comprising a top capping portion and a bottom support portion, the bottom support portion being aligned perpendicular to the top capping portion and having a height sufficient to house the plurality of light films. A top diffuser for diffusing the uniform plane of light. The plurality of light films has a thickness between 0.1 mm to 1.0 mm. In addition, the joining clip further comprises a light diffusion means.

3 Claims, 16 Drawing Sheets

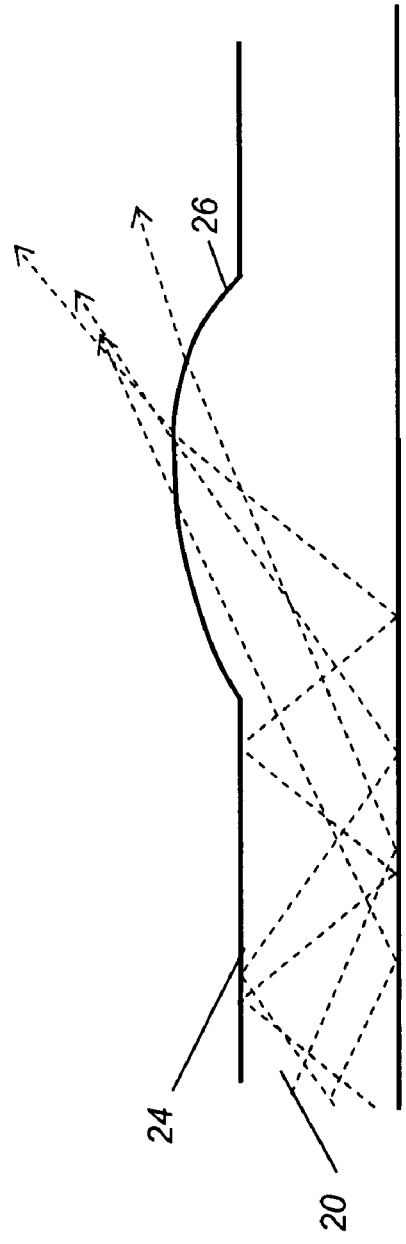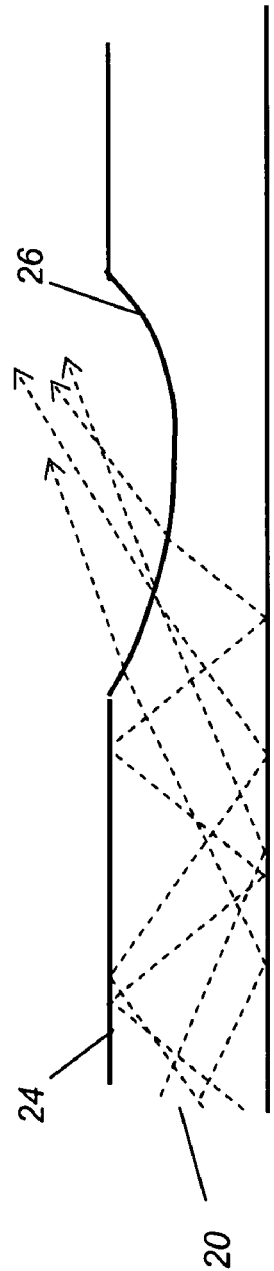
FIG. 3A
FIG. 3B

BACKLIGHT ILLUMINATION ASSEMBLY HAVING A JOINING CLIP WITH DIFFUSION MEANS

FIELD OF THE INVENTION

The present invention relates to display illumination and more particularly relates to optical coupling clip used to increase coupling efficiency of a point light source into a thin polymer light guiding film.

BACKGROUND OF THE INVENTION

Transmissive Liquid Crystal Display (LCD) panels offer a compact, lightweight alternative to other types of displays, but require some type of backlight illumination to provide the light for modulation. Backlight illumination for LCD and similar displays is typically provided by a light-providing surface that is positioned behind the LCD panel, relative to the viewer, and that redirects light from one or more light sources through the LCD panel. One exemplary type of light-providing surface is a Light Guiding Plate (LGP). The LGP acts as a waveguide, using Total Internal Reflection (TIR) for redirecting incident light that it receives from one or more sources that are positioned along its side edges. Some type of surface featuring is provided on the LGP in order to extract internally reflected light and redirect this light toward the display panel. One example of an illumination apparatus using an LGP is given in U.S. Pat. No. 5,999,685 entitled "LIGHT GUIDE PLATE AND SURFACE LIGHT SOURCE USING THE LIGHT GUIDE PLATE" to Goto et al.

Among drawbacks with solutions such as that proposed in the Goto et al. disclosure are the relative thickness and overall bulk of the conventional light guide plate. Conventional LGPs often exceed the thickness of the LCD panel itself. With the advent of larger displays such as LCD TV, and with the development of more compact solid-state light sources, such as Light-Emitting Diodes (LEDs), there is a need for an LGP solution that offers a thinner profile, weighs less, and is more flexible than existing designs. As displays continue to grow larger in scale and with increased use of more flexible substrates, there is growing demand for a more flexible LGP, with thickness approaching 1 mm.

A number of solutions have been proposed for LGP devices that are better suited to smaller and more flexible displays. However, the solutions proposed thus far have inherent drawbacks that limit their utility or make them difficult to manufacture. For example, various types of light-extracting features formed in the LGP surface have been proposed. However, the geometrical profile of many of the proposed light-extracting features require manufacturing methods such as injection molding or hot compression molding. These fabrication methods may work well with thicker materials, but prove increasingly difficult and impractical as LGP thickness decreases. For example, a number of proposed solutions require surface light-extraction features that have 90-degree vertical walls. Sharp angles at this scale can be very difficult to fabricate, using any method, with known plastic materials at the needed size. Still others require features having a relatively high height:width aspect ratio, features difficult to fabricate for similar reasons. Although such structures may work well in theory and although their fabrication may be possible, the manufacturing problems they present make many of the proposed designs impractical for mass production. Little attention seems to have been paid to how an LGP having light-extraction features with sharply-angled sidewalls can be economically mass produced.

Further, LCD TVs that use LEDs as a light source commonly use thick LGP with top emitting LEDs arranged around the perimeter of the LGP. The top emitting LEDs, which are arranged around the perimeter of the LGP are typically located under the bezel. The bezel serves to cover and absorb the unwanted LED generated light not coupled into the LGP/LED interface. Thus the uncoupled LED generated light is not used to illuminate the LCD and is wasted.

While the use of LED as a lighting source for a LC panel allows the LED to be globally dimmed in registration with the image content to reduce overall power consumption for LCD TV, these edge-lit LED TVs typically are not capable of being locally dynamically dimmed because of the perimeter positioning of the LEDs. Local dimming of LEDs has been shown to further reduce the overall power consumption of LED illuminated LCD TV compared to global dimming as small groups of LED can be dimmed in registration with the image content. Further local dimming also been shown to significantly improve the contrast ratio of the displayed image compared to global dimming.

Thus, it is recognized that there is a need for light guiding surface solutions that allow the use of flexible materials, that can be produced with a relatively thin dimensional profile, that are designed for high-volume manufacture and can be local dimmed.

SUMMARY OF THE INVENTION

In an embodiment of the present invention an integrated backlight illumination assembly for an LCD display comprising: a substrate for providing structural and functional support to the assembly; a bottom reflector provided on the substrate; a plurality of solid state light sources provided in an opening of the bottom reflector for providing a point light source; a plurality of light films and having light redirecting areas provided between the plurality of solid state light sources for redirecting and spreading the point light source to a uniform plane of light; a joining clip comprising a top capping portion and a bottom support portion, the bottom support portion being aligned perpendicular to the top capping portion and having a height sufficient to house the plurality of light films; a top diffuser for diffusing the uniform plane of light; the plurality of light films has a thickness between 0.1 mm to 1.0 mm; and wherein the joining clip has a light diffusion means.

In another embodiment of the present invention an integrated backlight illumination assembly for an LCD display comprising: a substrate for providing structural and functional support to the assembly; a bottom reflector provided on the substrate; a plurality of solid state light sources provided in an opening of the bottom reflector for providing a point light source; a plurality of light films and having light redirecting areas provided between the plurality of solid state light sources for redirecting and spreading the point light source to a uniform plane of light; a joining clip comprising a top capping portion and a bottom support portion, the bottom support portion being aligned perpendicular to the top capping portion and having a cavity sufficient to house the plurality of solid state light sources and wherein the joining clip further comprises a height between the top capping portion and the bottom support portion sufficient to house the plurality of light films; a top diffuser for diffusing the uniform plane of light; the plurality of light films has a thickness between 0.1 mm to 1.0 mm; and wherein the joining clip has a light diffusion means.

BRIEF DESCRIPTION OF THE DRAWINGS

FIGS. 3A, 3B, 3C, and 3D show light behavior for incident light at features in the light-guiding film surface.

DETAILED DESCRIPTION OF THE INVENTION

Figure 1:
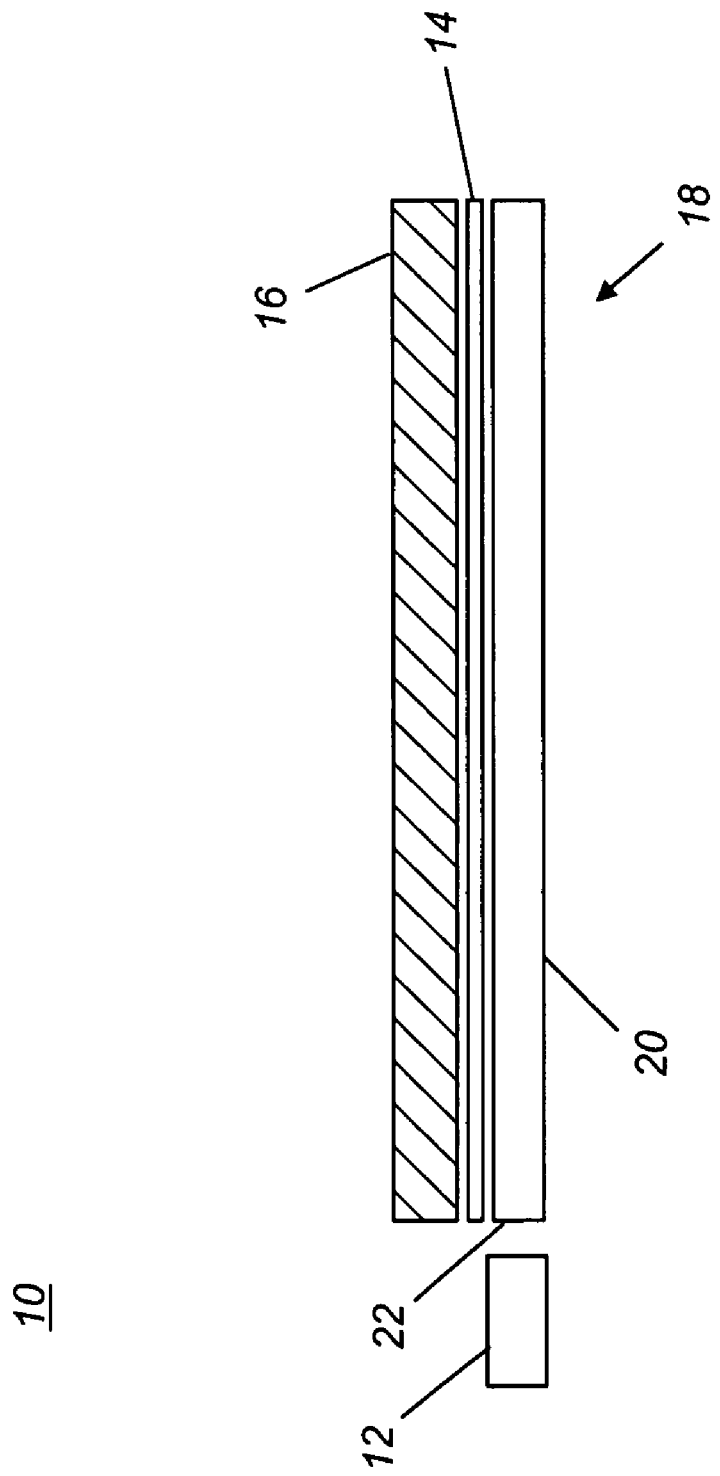
FIG. 1 shows a display apparatus using the light-guiding film of the present invention.

Referring to FIG. 1, there is shown, in cross-section, an embodiment of a display apparatus 10 with an backlight illumination assembly 18 using a light-guiding article, light-guiding film (LGF) 20, according to the present invention. A light source 12 directs illumination through an incident edge 22 of LGF 20. LGF 20 redirects this illumination outward, through one or more top diffusion films 14 and to a spatial light modulator, here an LCD display 16, that modulates the illumination.

Light source 12 can use any of a number of types of light-emitting elements. Conventional LGPs used for laptop computer and larger displays have used CCFLs (Cold-Cathode Fluorescent Lamps). LGF 20 of the present invention can use this thicker type of light source but is advantaged for use with thin-profile light sources such as a linear array of LEDs, linear array of OLED or other linear solid-state source.

Figure 2:
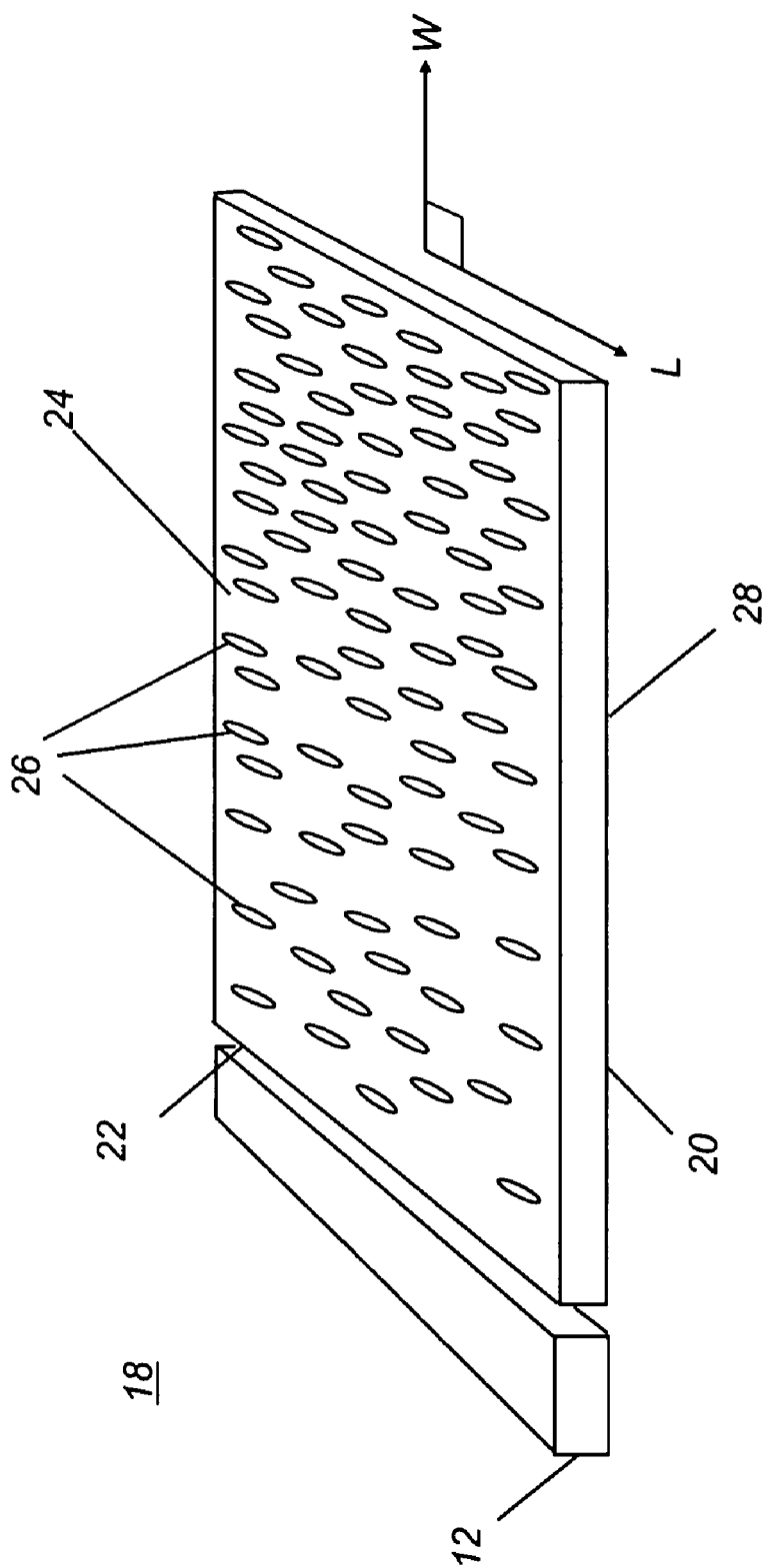
FIG. 2 shows a perspective view of the light-guiding film in one embodiment.

The perspective view of FIG. 2 shows aspects of LGF 20 and its light-exiting output surface 24 in illumination apparatus 18. As shown in FIG. 2, light source 12 directs illumination into incident edge 22 which is substantially orthogonal to output surface 24. Discrete light-extracting features 26 are formed on output surface 24, or, alternately, on a bottom surface 28, so that either or both output surface 24 and bottom surface 28 are patterned surfaces. As is seen in more detail in subsequent figures, light-extracting features 26 can be dimensionally extended along a length direction L of LGF 20 and can be narrower in a width direction W, orthogonal to length direction L. Light source 12 is generally arranged along length direction L. Light-extracting features 26 may be spatially distributed at equal intervals over surface 24 or 28; however, there can be advantages to embodiments in which the spatial distribution or the size or pitch of light-extracting features 26 varies with distance from incident edge 22 in width direction W, as is shown in FIG. 2 and described subsequently.

Figure 3C:
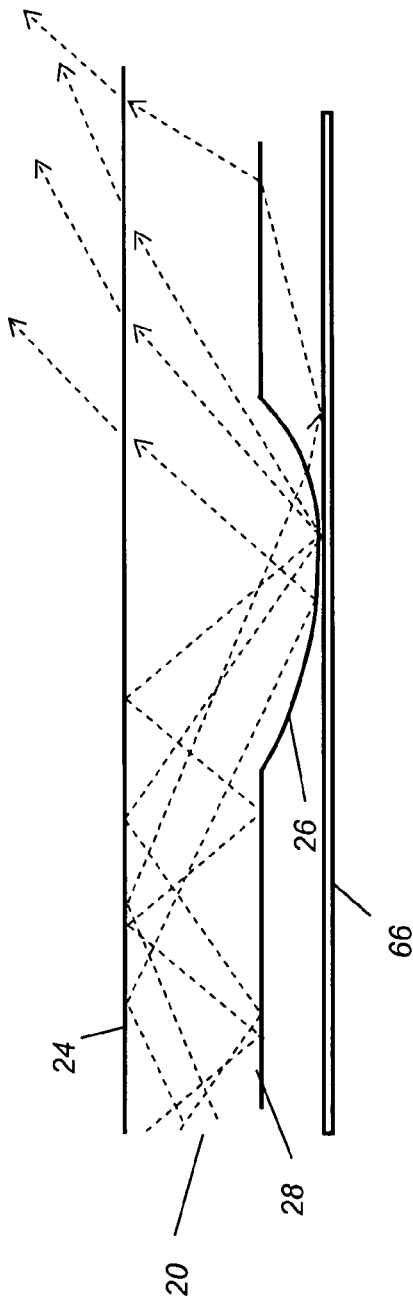

FIGS. 3A, 3B, 3C, and 3D show, in cross-section views, different arrangements of light-extracting features 26 on the patterned surface, either output surface 24 or bottom surface 28. Dashed lines in these figures indicate different exemplary light paths that illustrate the behavior of light-extracting features 26. Light is directed within LGF 20 by Total Internal Reflection (TIR), a principle familiar to those skilled in the light-guide art. The general function of light-extracting features 26, whether they protrude from or are formed into surface 24 or 28, is to frustrate TIR, causing this light to escape from LGF 20. FIGS. 3A and 3B show light behavior for two types of light-extracting features 26 formed on output surface 24, protruding from the surface or indented into the surface, respectively. In either case, internally reflected light is directed outward from output surface 24 when it impinges on the surface of light-extracting features 26.

Figure 3D:
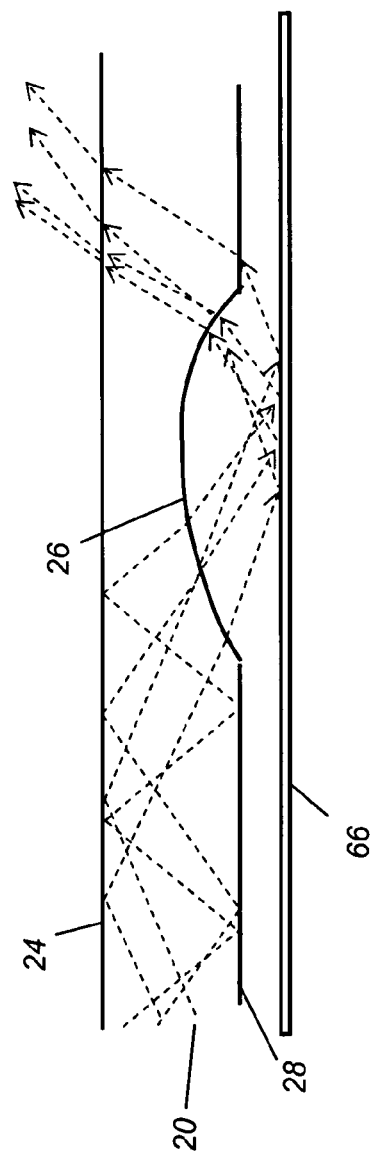

FIGS. 3C and 3D show alternate embodiments in which light-extracting features 26 are formed on bottom surface 28. A reflective surface 66 is provided as part of illumination apparatus 18 (FIGS. 1 and 2) with these embodiments for redirecting light that has been extracted using light extracting features 26. Reflective surface 66 redirects this light back through LGF 20 and out through output surface 24.

Figure 4:
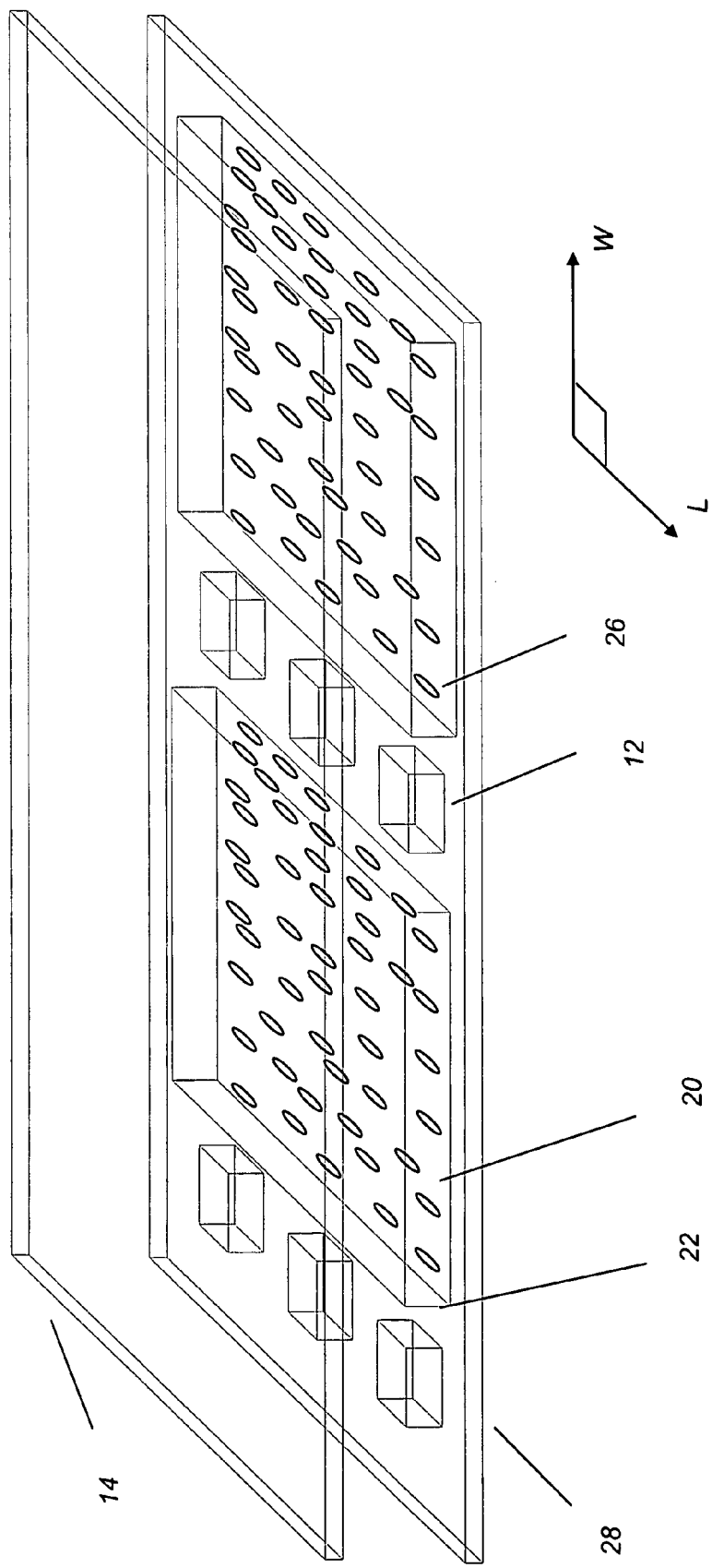
FIG. 4 is a perspective view showing a portion of the light-guiding film and a point light source in one embodiment.

FIG. 4 shows a perspective view of the light guiding film 20 and point light sources 12. The light sources 12 are arranged along the incident edge of light guiding film 20. Below the light guiding films is a reflector 28 to reflect light incident on the reflector 28 toward the film 14. Light guiding films 20 are arranged sequentially or in a pattern to create a uniform, bright backlight illumination assembly. Point light sources 12 are in the illumination area of the backlight illumination assembly. For LCD TV applications, the lengths L of the light guiding films 20 are preferably greater than the width W. More preferably, the length L is greater than 10 times the width W of the light guiding films.

The light sources 12 in FIG. 4 are preferably arranged such that the backlight illumination assembly can be locally dimmed in registration with image content of display devices. Local dimming of the point light sources has been shown to both reduce power consumption of LCD and significantly improve the contrast ratio of LCD. By dimming sub-groupings of light sources 12, small, defined areas of light guiding film 20 can be dynamically dimmed by changing the current supplied to light sources 12. The size of the dimmed area is a function of the number of point light sources that are dimmed and the width W of the light guiding film 20. The light sources 12 can be arranged to input light into a single light guiding film 20 or can be arranged to input light into two adjacent light guiding films. Light sources preferably are arranged in a side by side configuration to allow for even light input into light guiding film 20.

Referring to FIG. 4, light sources 12 are distributed and arranged in between light guiding films 20. The distribution of the light sources 12 between light guiding films 20 results in a backlight assembly that has lower temperature gradients across the backlight illumination assembly compared to edge lit backlight units that have concentrated heat generation points. High temperature gradients such as those found with prior art edge illuminated backlight assemblies results in undesirable waving or creasing of optical components due to differences in thermal expansion resulting from temperature gradients. Further, higher temperature gradients that exist in edge illuminated backlight assemblies often require expensive, heavy metallic frames to be used to resist thermal waving and buckling.

Referring to FIG. 4, a sufficiently small gap between the light guiding film 20 and joining clip 30 on the side opposite the incident edge 22 has been shown to reduce thermal undesirable buckling and waving. Buckling and waving of light guiding films reduces the uniformity of light output from the light guiding films. It has been found that the sufficiently small gap between the light guiding film 20 and joining clip 30 creates physical space for a thermally expanded light guiding film. This light guiding film gap is similar in concept to a thermal expansion gap common utilized in roads and bridges. The size of the thermal expansion gap is related to the operating conditions of the backlight assembly and the coefficient of thermal expansion of the light guiding films.

Referring to FIG. 4, the pitch of light sources 12 along the L direction is a function of the desired light output characteristics of light guiding film 20. The density, pitch and size of light extraction features 26 are also a function of the desired light output characteristics of light guiding film 20. The size, location and pitch of the light extraction features is also related to the optical output characteristics of light source 12. Important optical characteristics of light source 12 include chromaticity, light distribution and illuminance intensity. Generally, the density of light extraction features 26 is lower at the light incident surface 22 compared to the side opposite the light incident surface to allow for uniform extraction of light energy.

Referring to FIG. 4, substrate 28 preferably is reflective to visible light energy. Since a portion of the light energy entering light guiding film 20 is directed toward substrate 20, a reflective surface allow for the light directed toward the substrate 20 to be directed toward top diffuser 14, thereby increasing the efficiency of the backlight assembly unit. Further, substrate 28 preferably contains mating features for joining clip 30 such that joining clip 30 can snap into substrate 28 facilitating assembly of the backlight assembly unit.

Referring to FIG. 4, in one embodiment of the invention, light guiding film 20 is provided with a relative small amount area in the L and W plane that does not contain any light extraction features. This relatively small area, which is approximately 1 to 10% of the total area of light guiding film 20 in the L and W plane, functions as a mixing area for light sources 12. This mixing area is particularly important for multi-mode light sources such as RGB or RGBW or RGGB. The mixing area has been shown to be an efficient method for the mixing of multi-mode light sources to create white light with a higher color gamut than prior art white LEDs containing a blue die and yellow phosphor.

Figure 5:
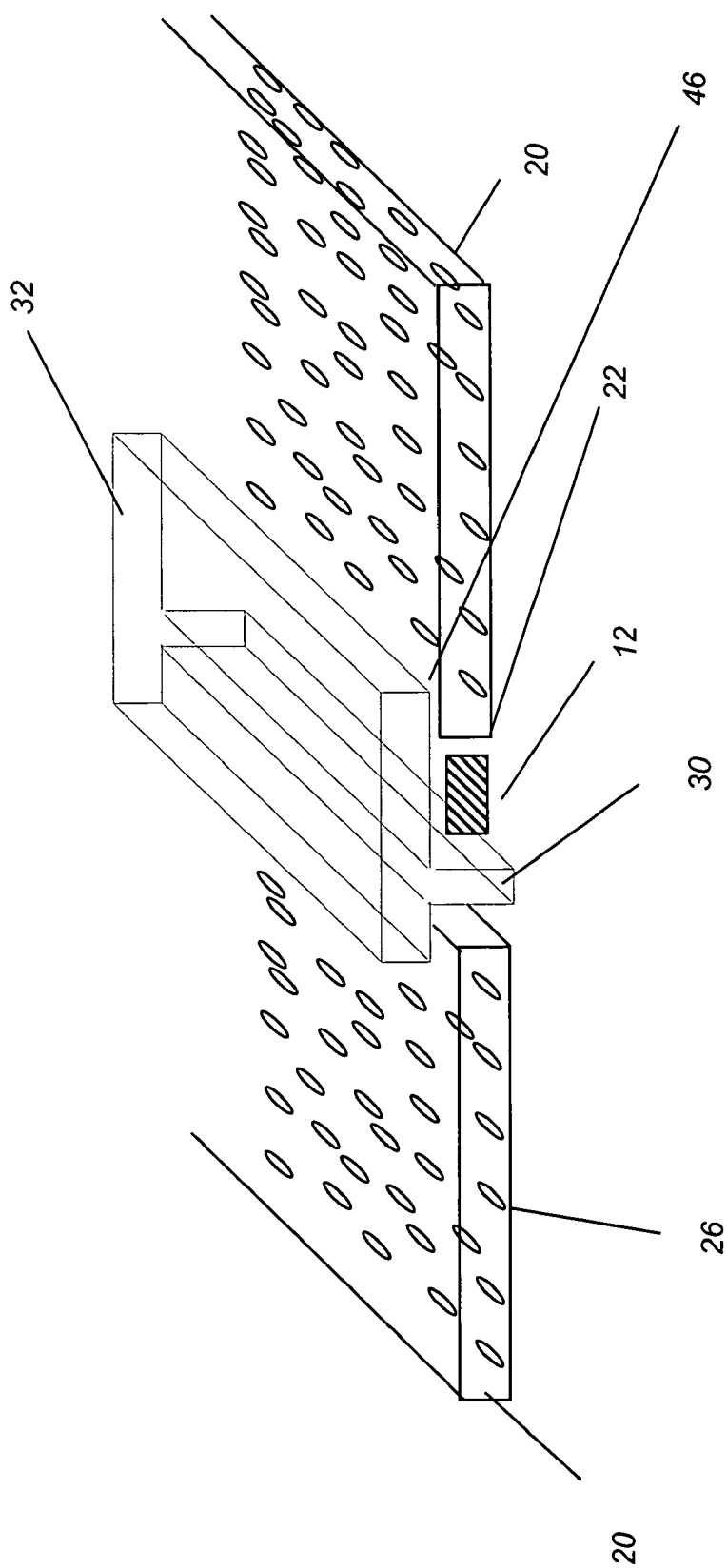
FIG. 5 is a perspective view showing a portion of the light guide film, location of a point light source and a joining clip.

FIG. 5 is a perspective view showing a portion of the light guide film 20, location of a light source 12 and a joining clip 30. The joining clip 30 performs several important functions critical to the quality of a backlight illumination assembly. First, joining clip 30 "joins" sections of light guiding film 20 such that individual light guiding films are joined create desirable uniform light output. Second, the joining clip diffuses both un-coupled light from light sources 12 and light leaking from the top or sides of light sources 12. An example of light leaking from light source 12 is light leaking through both the top and sides of a side emitting LED. In order to create a uniform light source for a LCD, the joining clip 30 preferably diffuses both the light leaking from the light source and un-coupled light energy such that the light output of the joining clip 30 is roughly equal to the light output from the light guiding films 20. Subsequent optical components such as light diffusers, prism films or reflective polarizer may also be used to further diffuse any light output differences between joining clip 30 and light guiding film 20. Thirdly, the joining clip 30 roughly aligns the center line of the emission area of the light source 12 with the center line of the light guide film 20. Rough alignment of these two center lines is preferred as light coupling efficiency between the light source and the light guiding film is maximized. Forth, the joining clip holds the individual sections of the light guiding film 20 against a bottom support ensuring that the light guiding films 20 remain in place during operation of the backlight assembly and during vibration encountered during shipping and handling. Fifth, the joining clip "blends" the seam between the adjacent sections of light guiding film 20. A visible seam reduces desirable uniformity of the backlight assembly and can be visually objectionable. Lastly, the joining clip provides an optical and physical stand-off between the light guiding films 20 and films or sheets that may be applied to the upper capping portion 32 of joining clip 30.

Referring to FIG. 5, preferably, the luminance difference between the joining clip 30, and the output surface 24 is +/−10%, more preferably +/−5%. Reducing the luminance difference between the joining clip and adjacent light guiding films results in a desirable uniform light output from the backlight assembly unit. Luminance differences greater than 15% can be visually observed and results in poor image quality. Reducing the luminance difference is achieved by balancing the light output from output surface 24, with the light output from joining clip 30. The luminance from output surface 12 is controlled by the size, shape and pitch of light extraction features 26 at or near the incident edge 22. The luminance of joining clip 30 is controlled by the diffusion characteristics of the joining clip material, the profile of the joining clip, the thickness of the joining clip and the amount of un-coupled light from light source 12 into incident edge 22.

Figure 6:
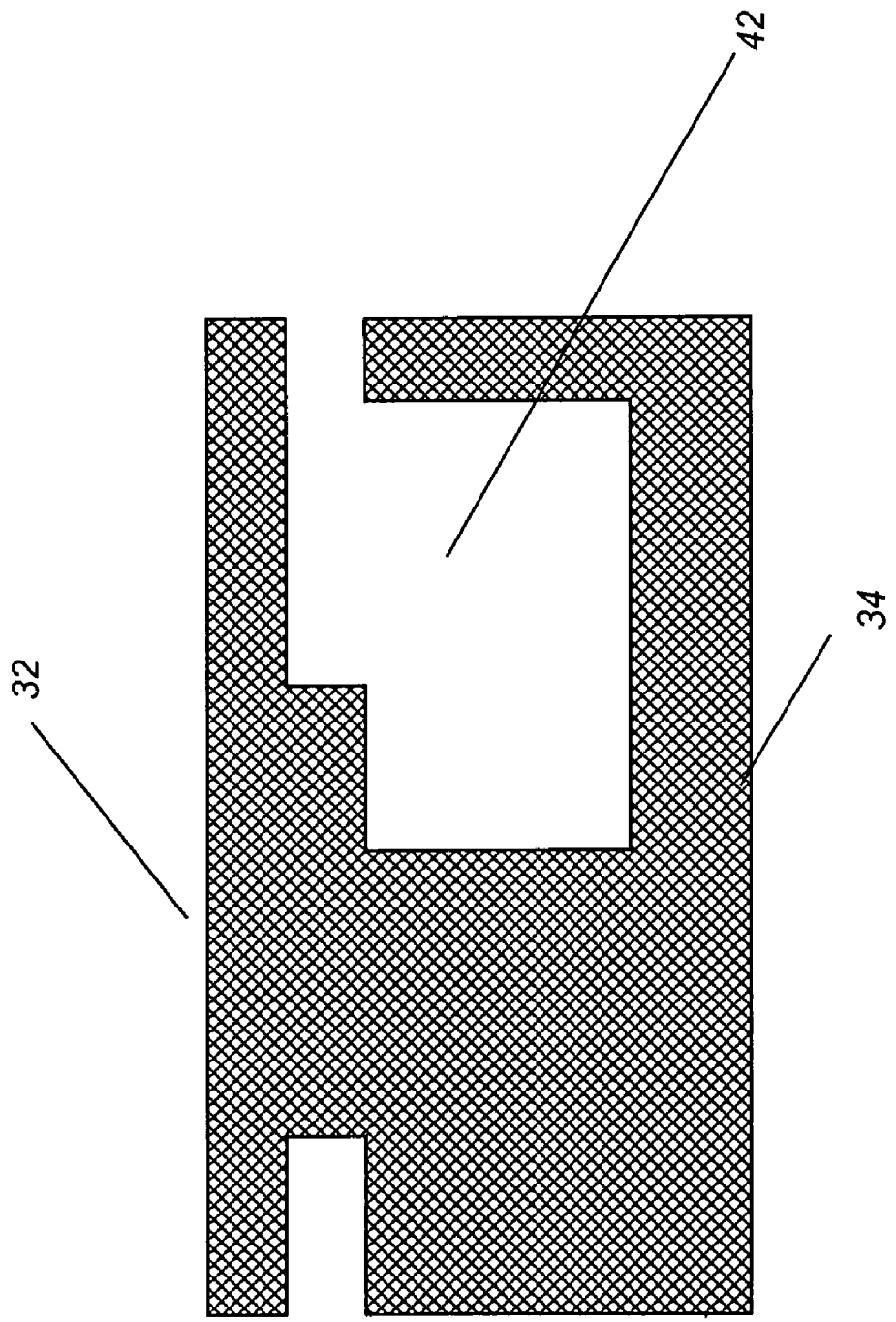
FIG. 6 is a cross section of a joining clip with a top capping portion and a bottom support portion.

FIG. 6 is a cross section of a joining clip 44 with a top 32 and bottom 34 support portion. The joining clip 44 shown in FIG. 6 contains opposing slots on each side of the clip for insertion of light guiding films. The joining clip 44 shown in FIG. 6 also has a light source area 42 for insertion of light source materials such as printed circuit boards, wires, electrical connections and various light sources. The joining clip 44 contains both a top capping portion and a bottom support portion and therefore does not require a separate bottom surface as with joining clip 30.

Figure 7:
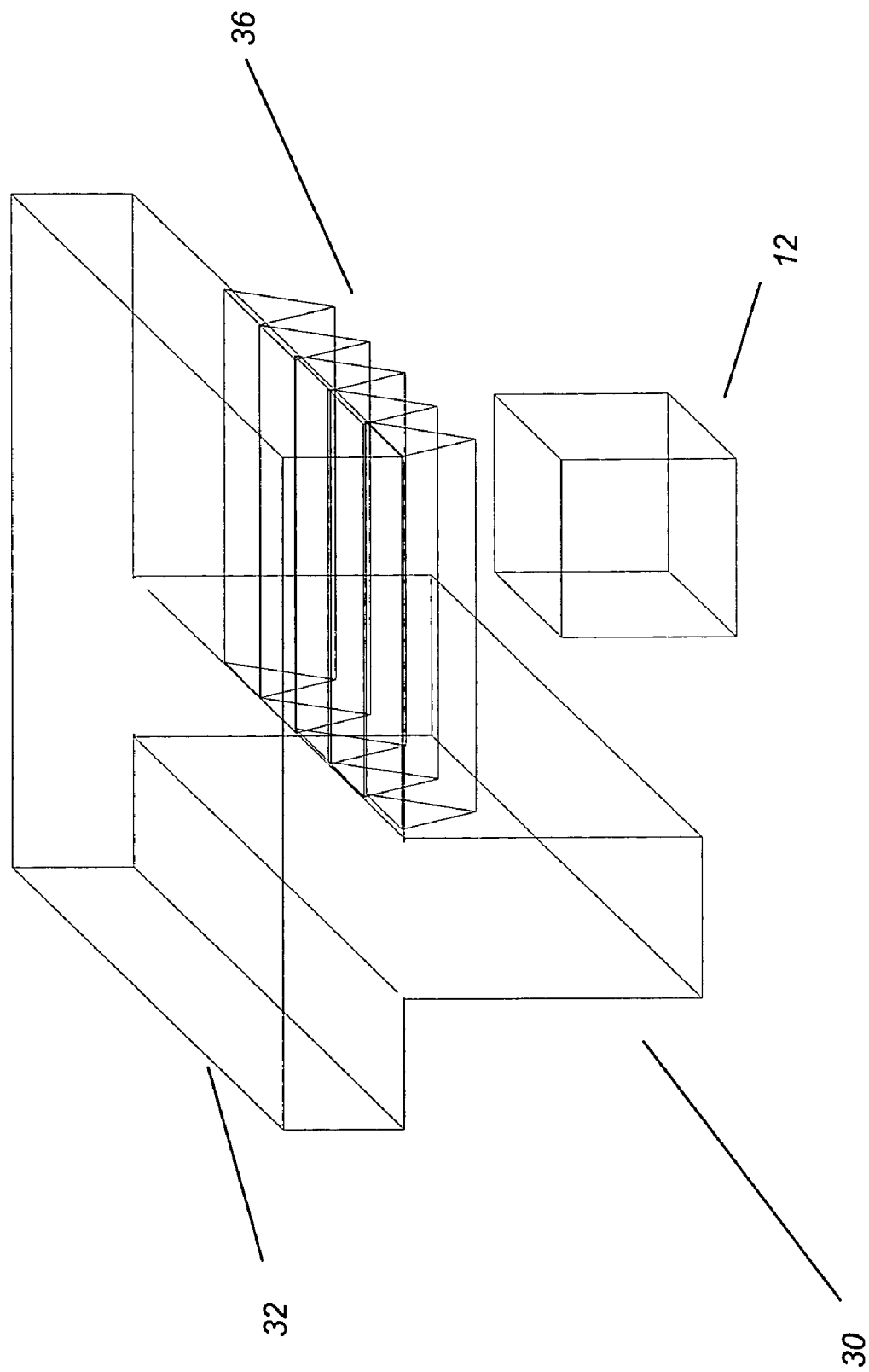
FIG. 7 is a perspective view of one embodiment of the invention showing joining clip having a light diffusion means and a point light source.

FIG. 7 is a perspective view of one embodiment of the invention showing joining clip 30 having a light diffusion means 36 relative to light source 12. The light diffusion means 36 preferably comprises a periodic pattern located adjacent point light source 12. Periodic patterns have been shown to efficiently diffuse both un-coupled light energy and light leaking from point source 12. The periodic pattern is preferably integral to joining clip 30 to reduce unwanted reflection and a loss in light transmission efficiency. Preferred periodic patterns comprise prisms, individual elements, hemispheres, and complex diffusion lenses such as those described in U.S. Pat. No. 6,721,102 (Bourdelais et al).

Figure 8:
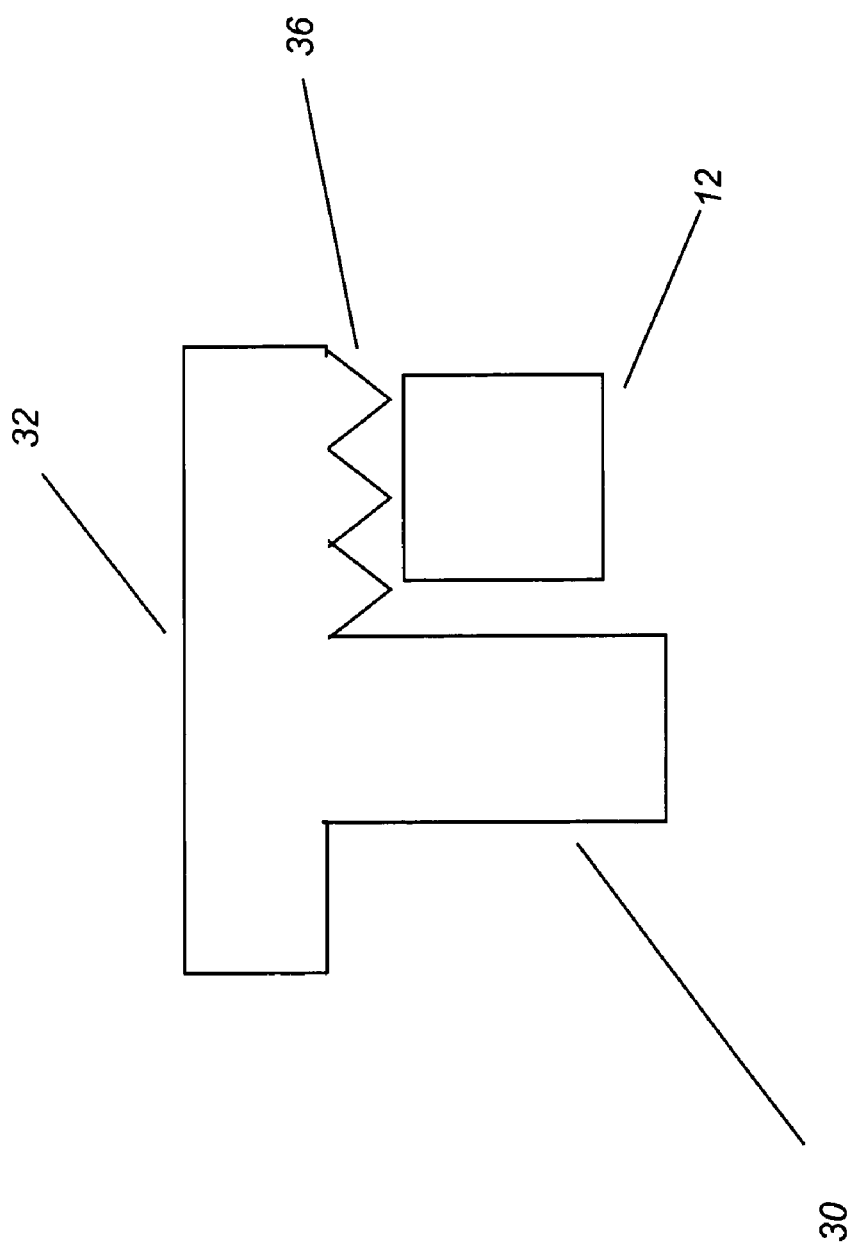
FIG. 8 is a cross section of one embodiment of the invention showing a joining clip having a light diffusion means and a point light source.

FIG. 8 is a cross section of one embodiment of the invention showing joining clip 30 having a light diffusion means 36 and a light source 12. The light source 12 is located adjacent to light diffusion means 36. Light diffusion means preferably comprises lenses that may be ordered or random. The lenses spread or diffuse the light by changing the direction of incident light rays. Examples of preferred lens geometry include but is not limited to prism, Fresnel, plano-concave, plano-convex, concavo-convex and concavo-concave. The size, pitch and material composition may be varied to provide the desired level of light diffusion.

Figure 9:
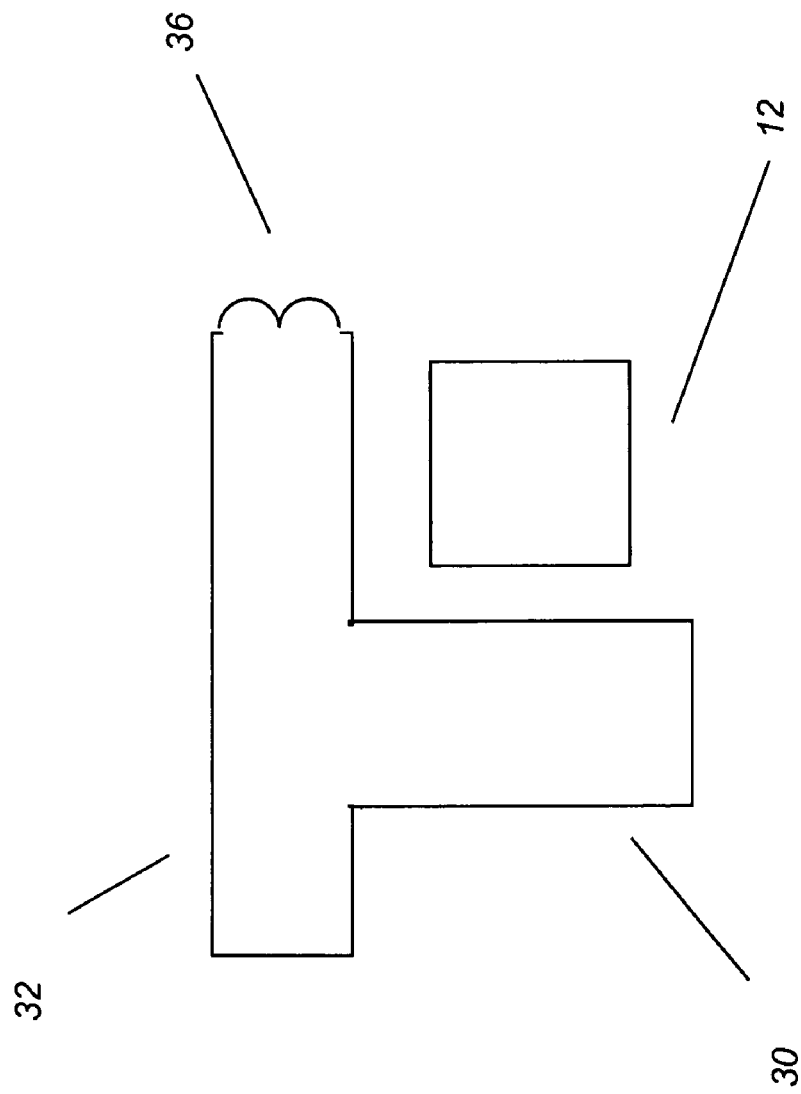
FIG. 9 is a cross section of one embodiment of the invention showing a joining clip, light source and light diffusion means having a patterned section.

FIG. 9 is a cross section of another embodiment of the invention showing a cross section of joining clip 30, light source 12 and light diffusion means 36 having a patterned section. It has been shown that the transition area 46 can be an area were an undesirable change in luminance can be observed if the light output from the joining clip 30 and light guide film are not closely matched. It has been found that by patterning one or more of the leading edges of the joining clip 30, the changes in luminance between the joining clip 30 and the light guiding film are smoothed and are not easily detected by the human eye in a completed backlight assembly unit.

Figure 10:
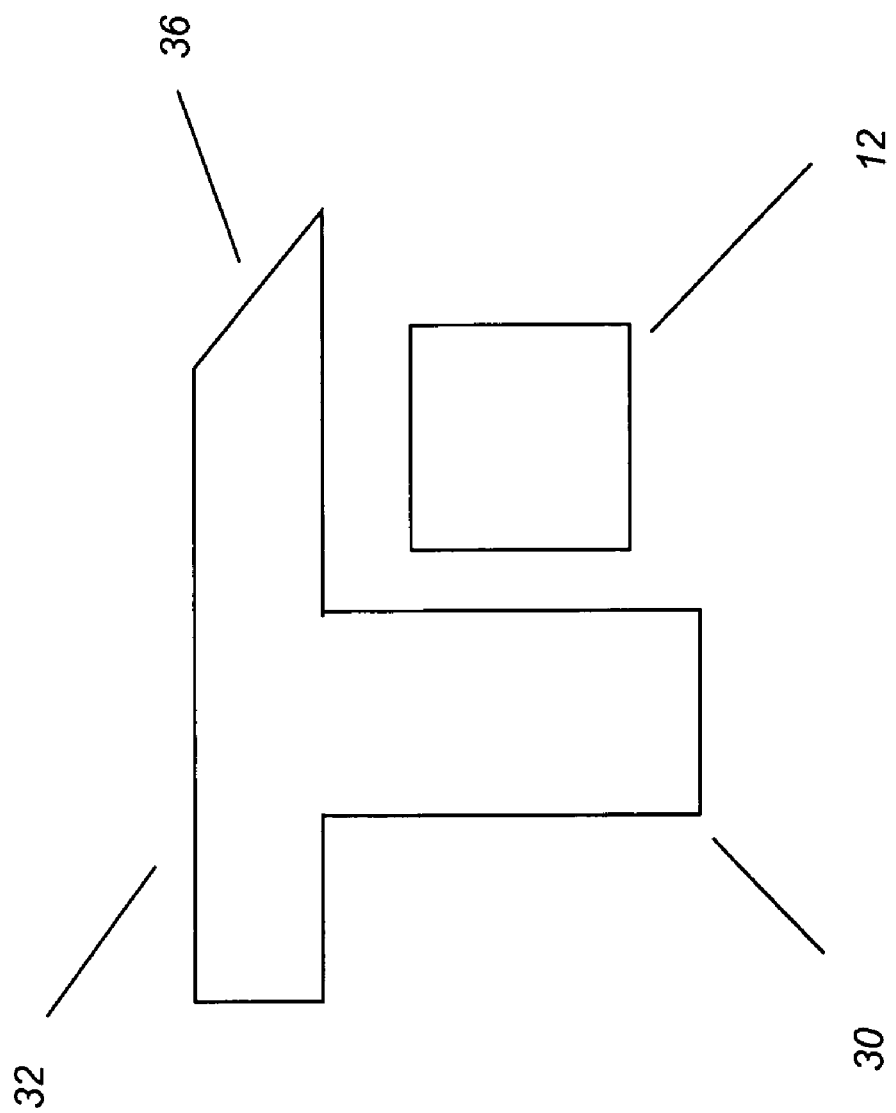
FIG. 10 is a cross section of another embodiment of the invention showing a joining clip, light source and light diffusion means having a sloping surface.

FIG. 10 is a cross section of another embodiment of the invention showing a joining clip 30, light source 12 and light diffusion means 36 having a sloping surface. The sloping surface has been shown to acceptably smooth the luminance transition from the joining clip 30 to the light guiding film 20.

Figure 11:
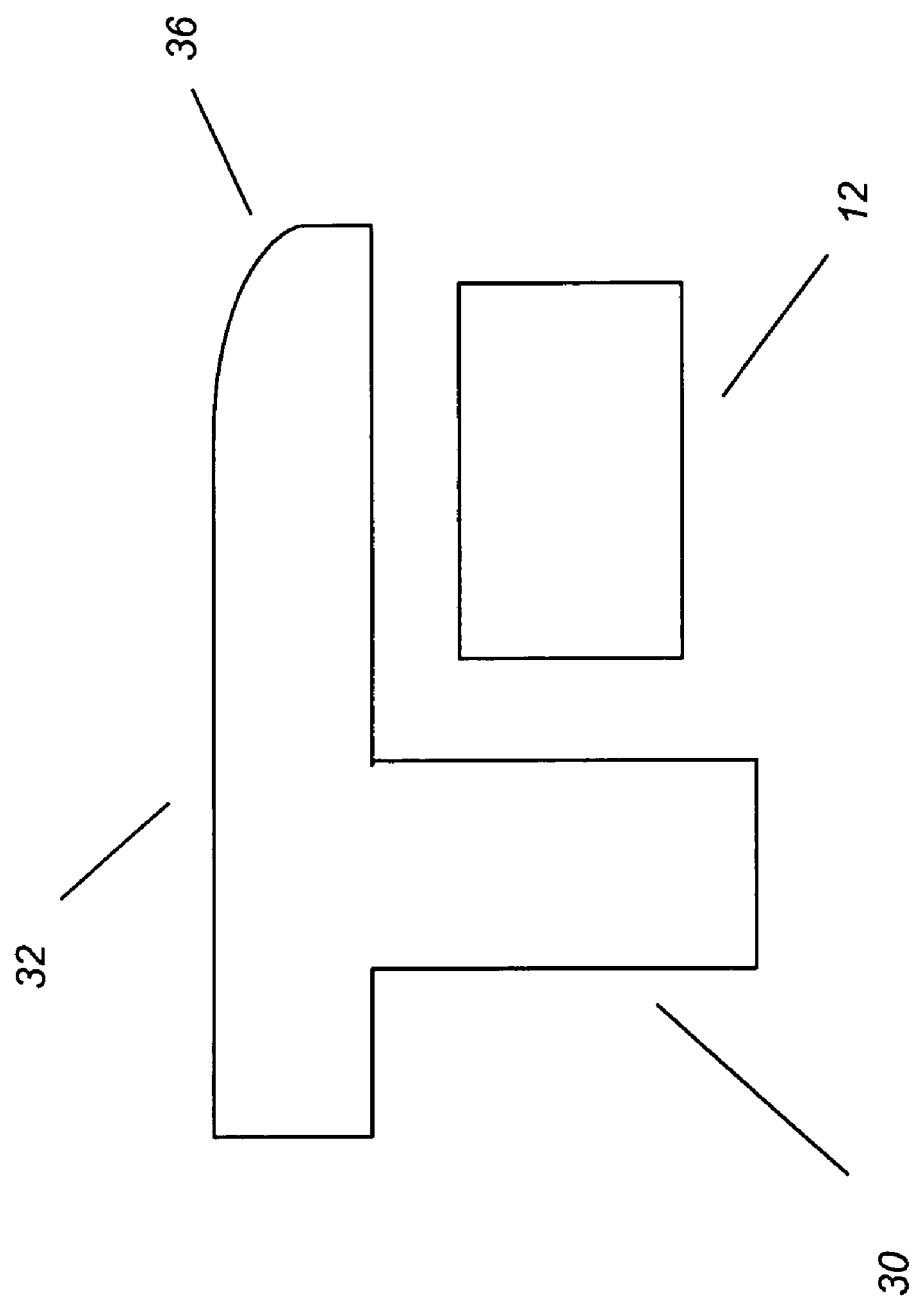
FIG. 11 is a cross section of one embodiment of the invention showing a joining clip, light source and light diffusion means having a curved surface.

FIG. 11 is a cross section of another preferred embodiment of the invention showing a joining clip 30, light source 12 and light diffusion means 36 having a curved surface. The sloping surface has been shown to smooth the luminance transition from the joining clip 30 to the light guiding film 20. The radius of curvature of the curved surface is largely dependent on the luminance difference between joining clip 30 and guiding film 20. The curved surface of diffusion means 36 may extend to the mid-point of joining clip 30 or may be along the entire top capping portion 32.

Figure 12:
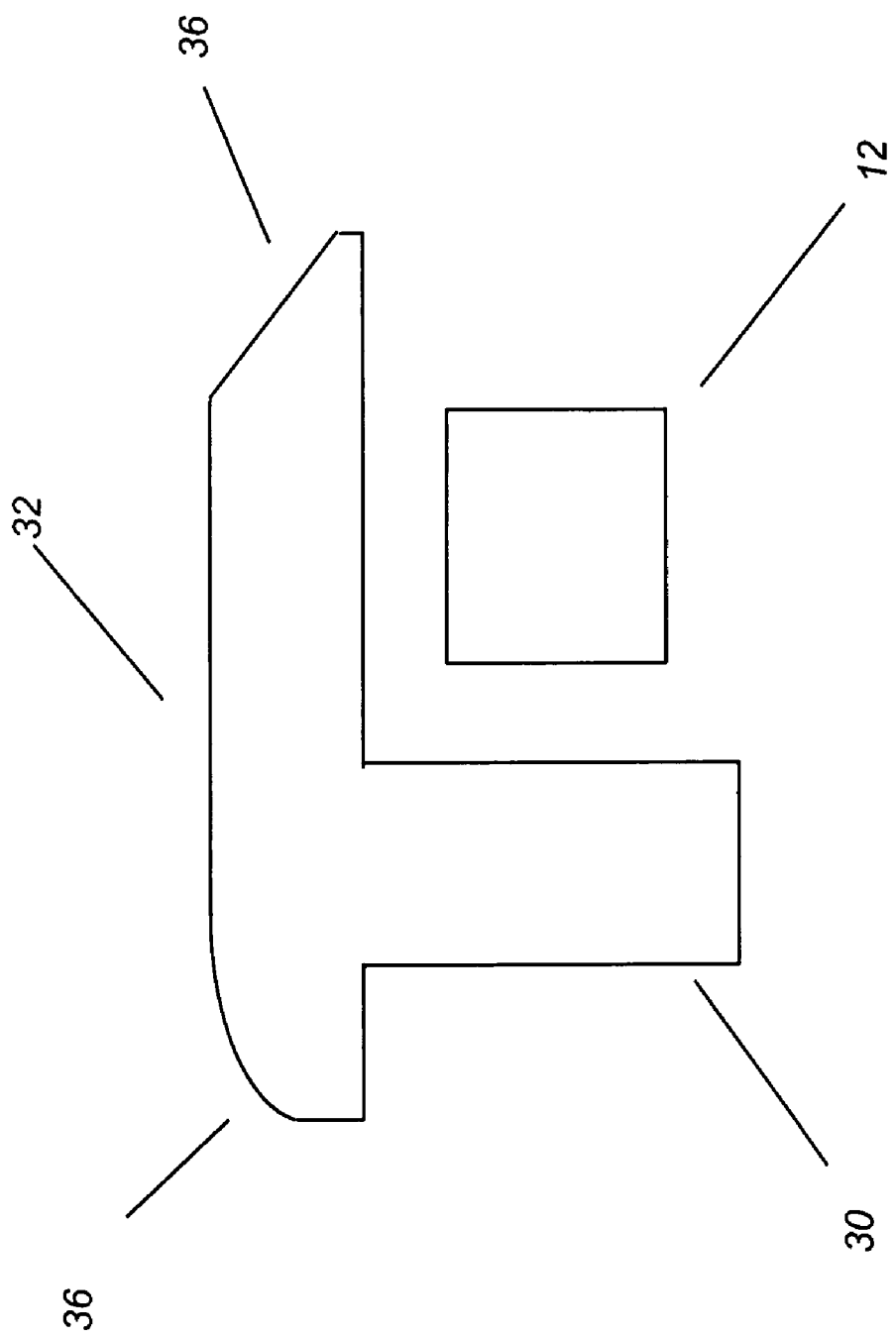
FIG. 12 is a cross section of one embodiment of the invention showing a joining clip, light source and light diffusion means having both a sloping and curved surface.

FIG. 12 is a cross section of another embodiment of the invention showing a joining clip 30, light source 12 and two light diffusion means 36. On one side of the joining clip 30 has a sloping surface while the other side of the joining clip 30 has a curved surface.

Figure 13:
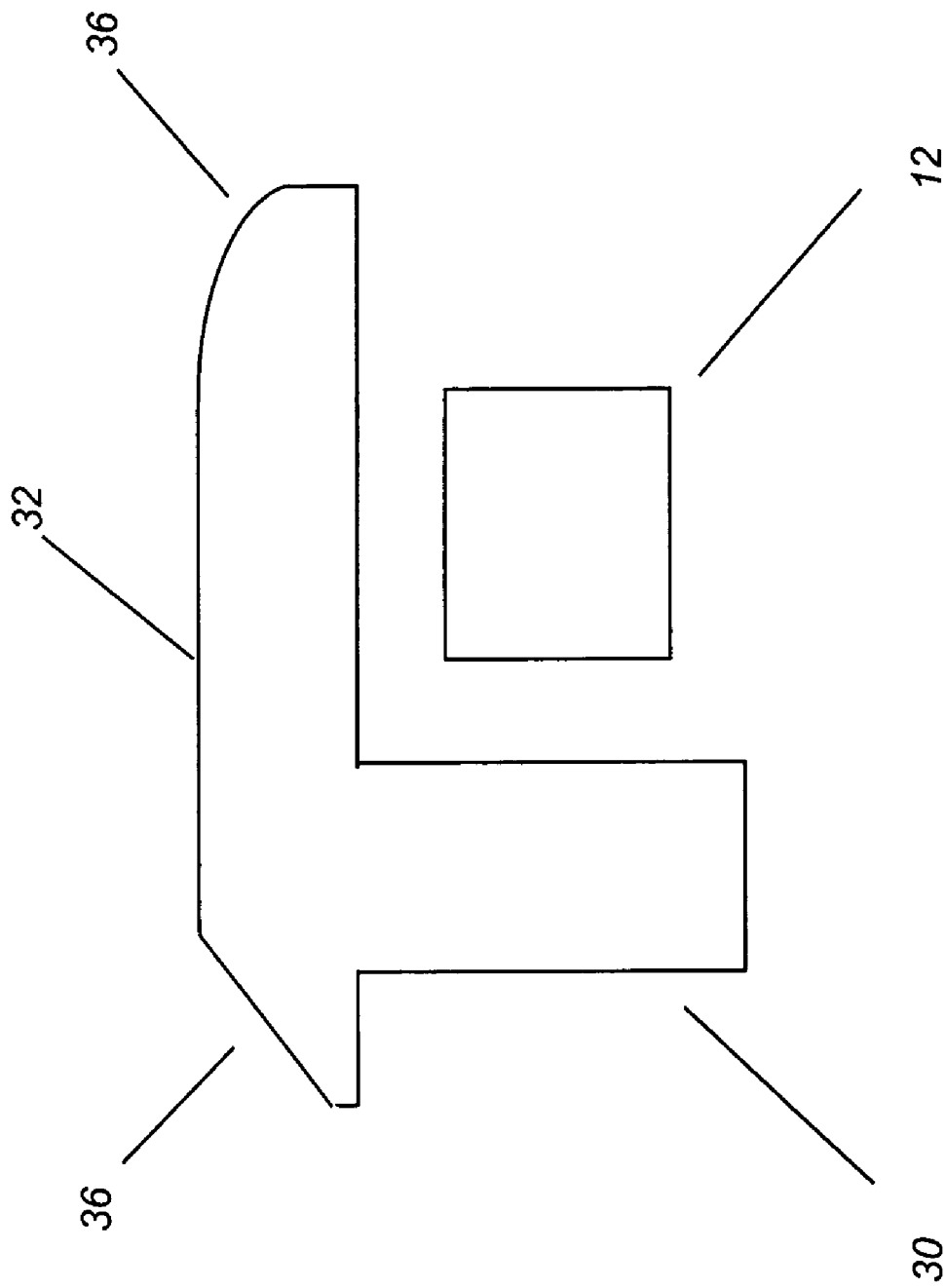
FIG. 13 is a cross section of one embodiment of the invention showing a joining clip, light source and light diffusion means having both a sloping and curved surface.

FIG. 13 is a cross section of another embodiment of the invention showing a joining clip 30, light source 12 and two light diffusion means 36. On one side of the joining clip 30 has a sloping surface while the other side of the joining clip 30 has a curved surface.

Figure 14:
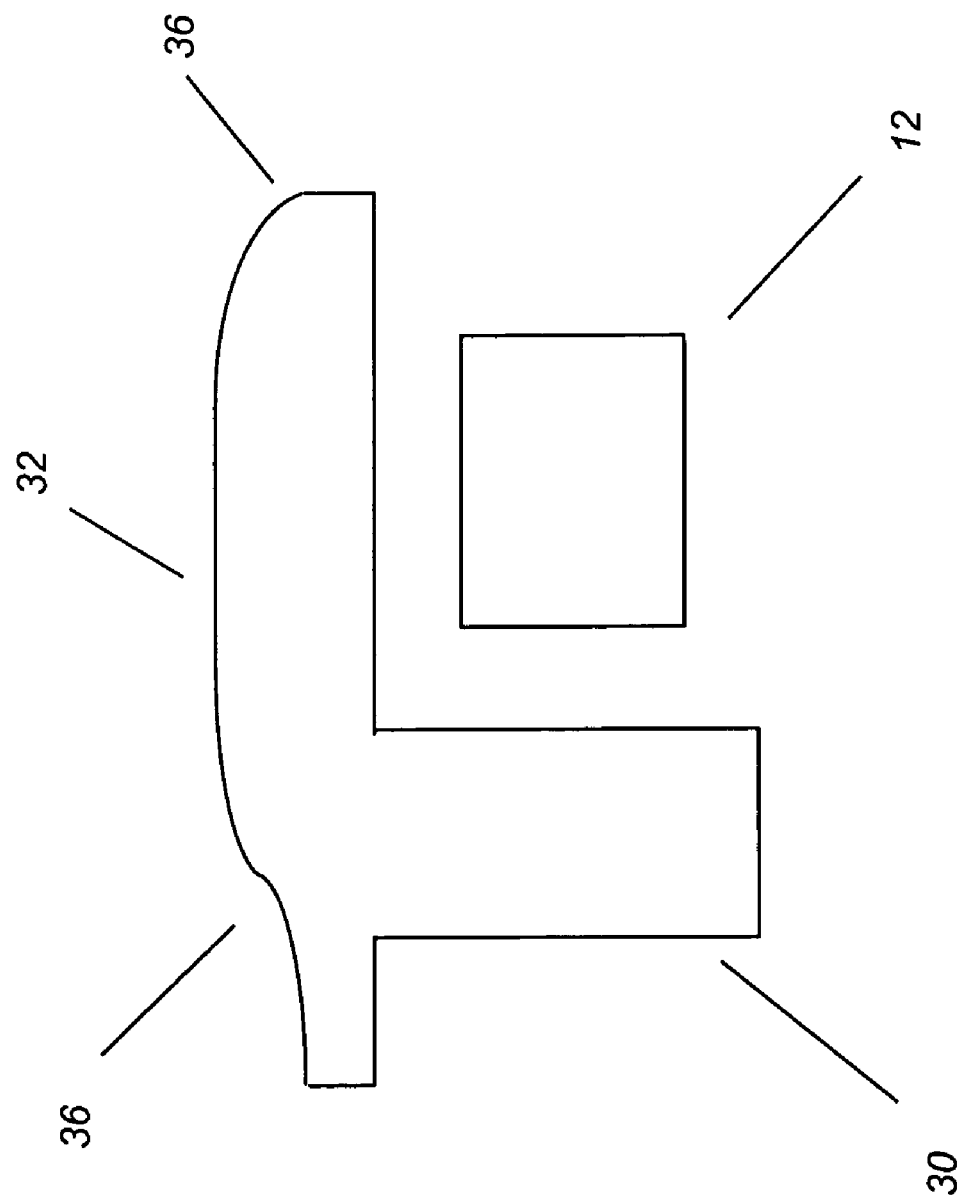
FIG. 14 is a cross section of one embodiment of the invention showing a joining clip, light source and light diffusion means having multiple curved surface.

FIG. 14 is a cross section of another embodiment of the invention showing a joining clip 30, light source 12 and light diffusion means 36 having multiple curved surfaces on each end of joining clip 30.

Figure 15:
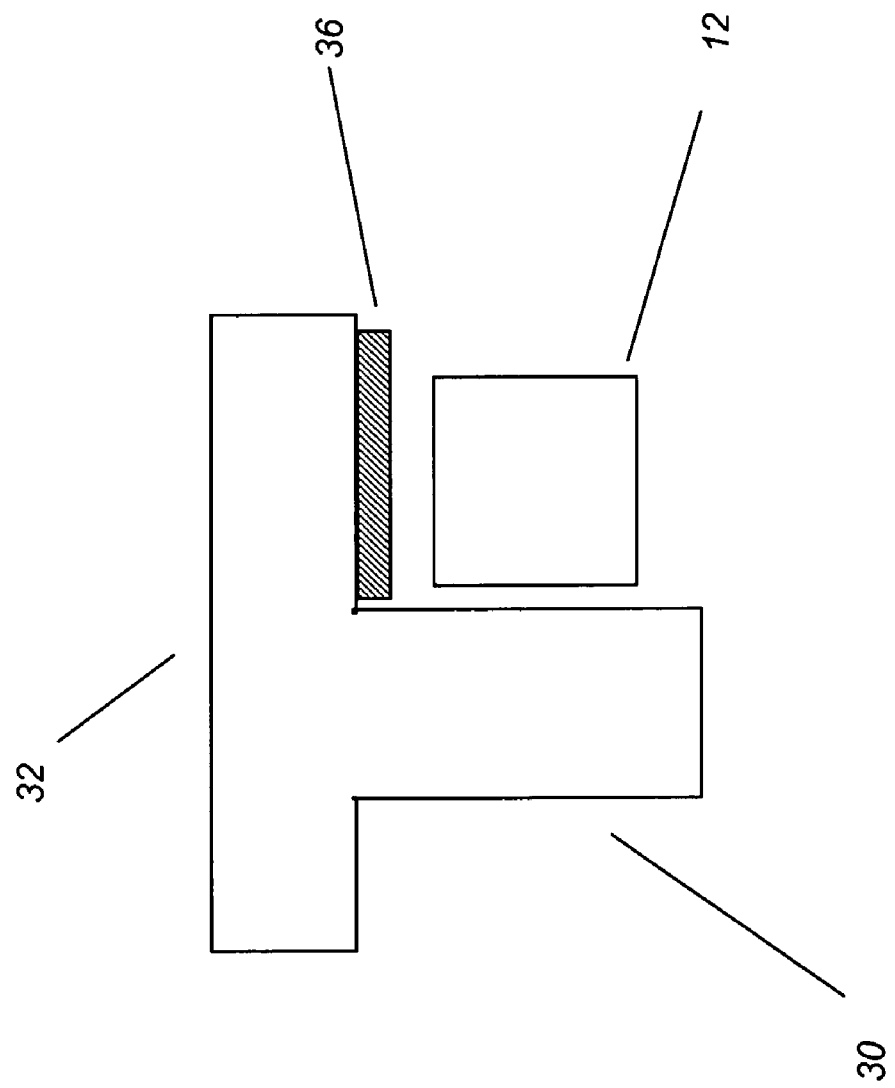
FIG. 15 is a cross section of one embodiment of the invention showing a joining clip with a light diffusion means adjacent to a point light source.

FIG. 15 is a cross section of another embodiment of the invention showing a joining clip 30 with a light diffusion means 36 adjacent to light source 12. The diffusion means 36 comprises an adhered diffuser. The adhered diffuser preferably comprises a polymer matrix containing scattering addenda such as $TiO_2$, core shell particles or glass beads. Additionally the polymer matrix may also contain organic dyes or pigments that modulate the color of transmitted light. Light diffusion means 36 may be uniformly printed or printed in a pattern using ink jet or screen printing techniques for example or the adhered diffuser may be adhered to joining clip 30 by means of an adhesive or solvent welded.

Materials Used

LGF 20 may be formed from any of various types of transparent materials, including, but not limited to polycarbonate, polyethylene terephthalate (PET), polyethylene naphthalate (PEN), or polymethyl methacrylate (PMMA).

Features formed on the patterned surface of the light-guiding film help to provide illumination for LCD and other types of backlit displays, particularly for smaller displays and portable devices. Embodiments of the present invention provide a light-guiding film that can be fabricated at thickness of 1 mm or less. This makes the LGF of the present invention particularly advantageous for use with LED, OLED or laser arrays and other linear solid state light arrays.

The invention claimed is:

1. An integrated backlight illumination assembly for an LCD display comprising: a substrate for providing structural and functional support to the assembly; a bottom reflector provided on the substrate; a plurality of solid state light sources provided in an opening of the bottom reflector for providing a point light source; a plurality of light films and having light redirecting areas provided between the plurality of solid state light sources for redirecting and spreading the point light source to a uniform plane of light; a joining clip comprising a top capping portion and a bottom support portion, the bottom support portion being aligned perpendicular to the top capping portion and having a cavity housing the plurality of solid state light sources and wherein the joining clip further comprises a height between the top capping portion and the bottom support portion housing the plurality of light films; a top diffuser for diffusing the uniform plane of light; the plurality of light films has a thickness between 0.1 mm to 1.0 mm; and wherein the joining clip has a light diffusion means; and wherein the joining clip further comprises polymer beads having a core and a shell wherein the index of refraction difference between the core and shell is between 0.02 and 0.20.

2. The backlight illumination assembly of claim 1 wherein the height between the top capping portion and the bottom support portion is between 1.3 and 5 mm.

3. The backlight illumination assembly of claim 1 wherein the joining clip comprises materials selected from polycarbonate, polymethyl methacrylate (PMMA), polystyrene, urethane, polypropylene, polysulfone and nylon.

* * * * *